(12) United States Patent
Kannan et al.

(10) Patent No.: US 9,792,182 B2
(45) Date of Patent: Oct. 17, 2017

(54) CHECKPOINT GENERATION

(71) Applicant: HEWLETT PACKARD ENTERPRISE DEVELOPMENT LP, Houston, TX (US)

(72) Inventors: Sudarsun Kannan, Palo Alto, CA (US); Paolo Faraboschi, Sant Cugat Barcelona (ES); Moray McLaren, Bristol (GB); Dejan S. Milojicic, Palo Alto, CA (US); Robert Schreiber, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 788 days.

(21) Appl. No.: 13/755,664

(22) Filed: Jan. 31, 2013

(65) Prior Publication Data

US 2014/0214770 A1    Jul. 31, 2014

(51) Int. Cl.
*G06F 7/00* (2006.01)
*G06F 17/00* (2006.01)
*G06F 11/14* (2006.01)

(52) U.S. Cl.
CPC ...... *G06F 11/1438* (2013.01); *G06F 2201/82* (2013.01)

(58) Field of Classification Search
CPC ........... G06F 2201/84; G06F 17/30067; G06F 11/1451; G06F 11/1435; G06F 11/1469
USPC ......................................................... 707/649
See application file for complete search history.

(56) References Cited

U.S. PATENT DOCUMENTS

| | | | |
|---|---|---|---|
| 5,630,047 A * | 5/1997 | Wang | 714/15 |
| 5,649,196 A * | 7/1997 | Woodhill et al. | 711/148 |
| 7,065,540 B2 * | 6/2006 | Chandrasekaran et al. | 707/674 |
| 7,206,964 B2 * | 4/2007 | Moser et al. | 714/13 |
| 7,305,582 B1 * | 12/2007 | Moser et al. | 714/13 |
| 7,308,607 B2 * | 12/2007 | Reinhardt et al. | 714/25 |
| 8,108,718 B2 | 1/2012 | Muralimanohar et al. | |
| 2006/0123250 A1 * | 6/2006 | Maheshwari et al. | 713/193 |
| 2010/0174879 A1 * | 7/2010 | Pawar et al. | 711/161 |
| 2012/0158672 A1 * | 6/2012 | Oltean et al. | 707/692 |

* cited by examiner

*Primary Examiner* — Robert Beausoliel, Jr.
*Assistant Examiner* — Michael Pham
(74) *Attorney, Agent, or Firm* — Trop, Pruner & Hu, P.C.

(57) ABSTRACT

A technique includes generating a checkpoint for an application that is executing on a plurality of nodes of a distributed computing system. Forming the checkpoint includes selectively regulating communication of data from the plurality of nodes to a storage subsystem based at least in part on a replication of the data among the nodes.

20 Claims, 7 Drawing Sheets

CHECKPOINT GENERATION

BACKGROUND

For purposes of improving reliability, high-performance applications may checkpoint their data. In this manner, the generation of a checkpoint typically involves storing data indicative of a memory image of an application process at a particular time. The checkpoint may be a full checkpoint, in which data indicative of entire memory image is stored or an incremental checkpoint, which represents the changes to the image after the last checkpoint.

Checkpoint mechanisms may be classified as being application transparent or application explicit. Transparent checkpoint mechanisms do not involve modification to the application program code, wherein explicit checkpointing modifies the program code.

DETAILED DESCRIPTION

Techniques and systems are disclosed herein for purposes of generating transparent checkpoints for an application that is being executed on one or multiple computing nodes of a distributed computing system. Due to the relatively large footprint of a high performance application (a High Performance Computing (HPC) scientific application, for example), transparent checkpoint mechanisms may use a significant amount of storage space. Moreover, application performance may be affected due to checkpoint data movement overhead from individual computing nodes to a persistent storage location of the checkpoint storage system. Thus, in general, the generation of transparent checkpoints may consume a significant amount of resources, such as network bandwidth, of the computing system. Systems and techniques are disclosed herein for purposes of reducing the overhead of such transparent checkpointing.

More specifically, systems and techniques are disclosed herein, for combining checkpoint data of all application processes and compressing the data into a single data checkpoint chunk, thereby reducing storage requirements. Moreover, systems and techniques are disclosed herein in which the checkpoint data movement overhead across the network is reduced by identifying redundant data across application processes occurring in different physical computing nodes and by checkpointing single copies of the redundant data to the remote storage location.

Figure 1:
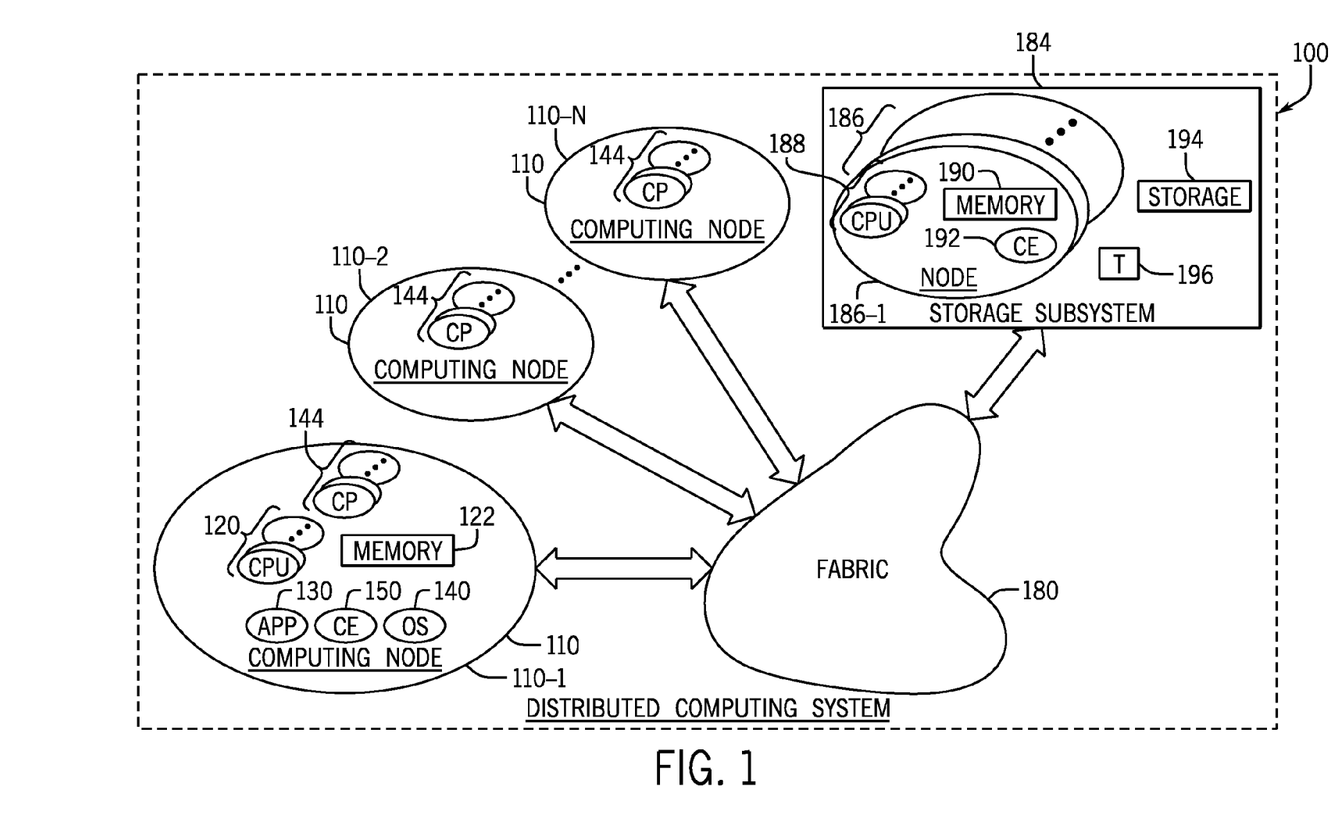
FIG. 1 is a schematic diagram of a distributed computing system according to an example implementation.

As a more specific example, FIG. 1 depicts a distributed computing system 100 in accordance with an exemplary implementation. In general, the distributed computing system 100 includes computing nodes 110 (N computing nodes 110-1, 110-2 . . . 110 N, being depicted in FIG. 1 as examples), which are coupled together by network fabric 180. As examples, the network fabric 180 may be local area network (LAN)-based fabric, wide area network (WAN)-based fabric, Internet-based fabric or a combination of these fabrics, depending on the particular implementation. Moreover, using the fabric 180, the computing nodes 110 may communicate with a storage subsystem 184 in which checkpoint data is stored.

More specifically, a given computing node 110-1 is a physical machine made up of actual software and hardware, which may execute a particular process 130 of an application. In this regard, using the computing 110-1 as an example, the computing node 110-1 may include such hardware as one or multiple central processing units (CPUs) 120, memory 122 and so forth. In general, the memory 122 may be formed from non-transitory storage devices, such as semiconductor storage devices, optical storage devices, magnetic storage devices or a combination of such devices, as examples. In general, by executing machine executable instructions that are stored in, for example, the memory 122, the CPU(s) 120 may form one or more software-based entities of the node 110-1, such as an application process 130 (an application process of an HPC scientific application, for example), a checkpoint engine 150, an operating system 140, and so forth. The other nodes 110-1 . . . 110-N may have similar structures, in accordance with example implementations.

In general, each node 110 has a checkpoint engine 150 (formed from machine executable instructions that are executed by the CPU(s) 120 of the node 110, for example), which, during the execution of the application process 130 on the node 110, generates potential checkpoint data elements 144 (memory pages, for example) for a given checkpoint interval. Thus, in general, for each computing node 110, the checkpoint data elements 144 are captured in the checkpoint process for purposes of forming a corresponding checkpoint for the computing node 110, which is stored in the storage subsystem 184.

For the specific example of FIG. 1, the storage subsystem 184 includes one or multiple server nodes 186 (P server nodes 186-1 . . . 186-P being depicted in FIG. 1, as examples). In general, a given server node 186 may be a physical machine that is made up of actual hardware and software. For example, the node 186-1 is depicted in FIG. 1 as including multiple central processing units (CPUs) 188, memory 190, and so forth. Moreover, the server node 186-1 is depicted in FIG. 1 as including a checkpoint engine 192 that operates to communicate with the checkpoint engines 150 of the computing nodes 110 to reduce the storage and network requirements associated with the checkpointing, as described herein. As an example, the checkpoint engine 192 may be formed from machine executable instructions that execute on one or multiple nodes 186.

As also depicted in FIG. 1, in accordance with example implementations, the storage subsystem 184 may include a hash table 196, which the checkpoint engine 192 uses to merge redundant checkpoint data.

In general, checkpoint data may be stored in storage 194 of the storage system 184. The storage 194 represents one or multiple non-volatile storage devices and may be magnetic storage, optical storage, solid state storage, and so forth, depending on the particular implementation.

In accordance with an example implementation, the checkpoint engine 192 is constructed to combine, or compress, checkpoints that are provided by the checkpoint engines 150 of the computing nodes 110 into a single checkpoint chunk before the chunk is stored in the storage 194.

In this manner, without the compression into a single chunk, a transparent checkpoint mechanism may use a considerable amount of storage to checkpoint all of the memory pages that form the entire memory footprint of an application. Although the checkpoint data communicated by the computing nodes 110 may represent incremental checkpoints, for applications with large modified data sizes across checkpoint intervals, such incremental approach may not significantly reduced the storage used for these checkpoints. Therefore, by combining all of the checkpoint data in a persistent remote storage location and compressing this data into a single data chunk, the storage requirements may be significantly reduced by exploiting data similarity (i.e., redundancy) across the multiple computing nodes 110. Considering that several of the computing nodes 110 may execute the same application over different data sets, the reduction opportunities may be significant, in accordance with example implementations. Moreover, combining the checkpoint data before compression provides substantial storage benefits, as compared to a per process checkpoint data compression.

Figure 2:
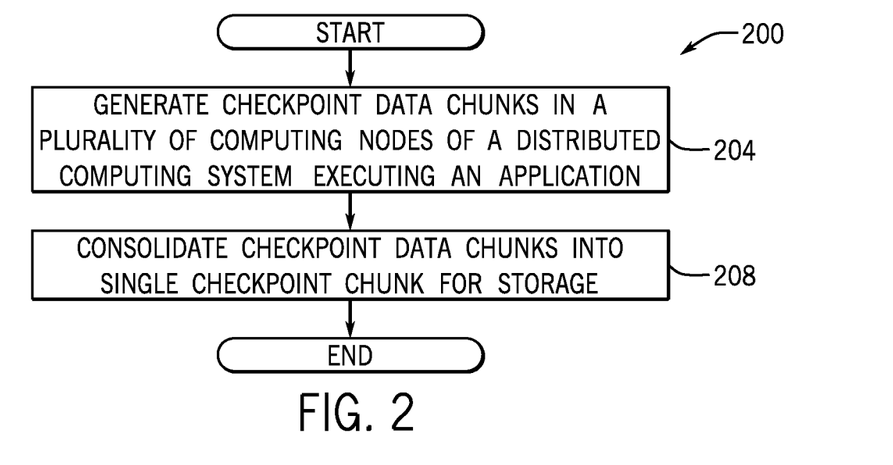
FIG. 2 is a flow diagram depicting a technique to reduce a storage size associated with checkpointing according to an example implementation

Thus, referring to FIG. 2 in conjunction with FIG. 1, in accordance with example implementations, a technique 200 includes generating (block 204) checkpoint data chunks in a plurality of computing nodes of a distributed computing system executing an application. The checkpoint data is consolidated, pursuant to block 208, into a single checkpoint for storage.

Referring back to FIG. 1, in accordance with example implementations, the checkpoint engine 192 of the storage system 184 identifies data redundancy across application processes by storing signatures (hashes, for example) of the checkpoint data in the hash table 196 of the storage subsystem 184. In this manner, the checkpoint engine 192 uses the hash table 196 to identify redundant data elements (redundant pages, for example) and instruct the computing nodes 110 to transmit a single copy of a particular data element (a page, for example). Thus, if multiple computing nodes 110 store an identical page of checkpoint data, only one of the nodes 110 is instructed by the checkpoint engine 192 to transmit that data to the storage subsystem 184 to form the committed checkpoint.

Figure 3:
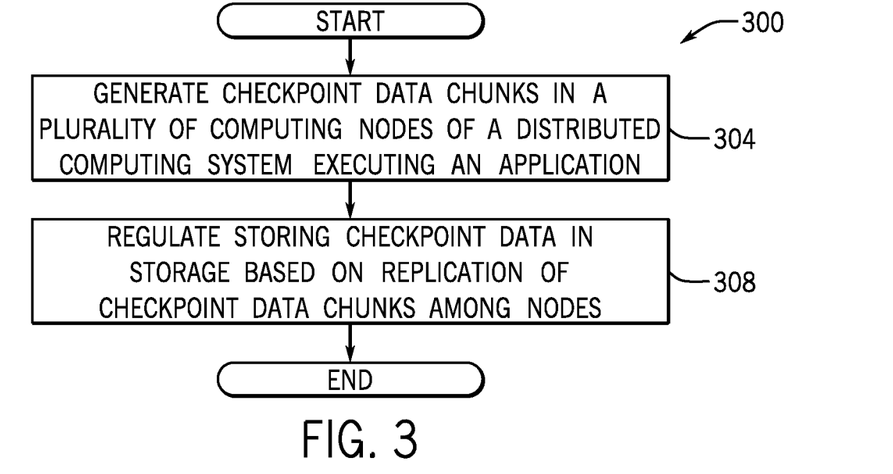
FIGS. 3 and 6 are flow diagrams depicting techniques to reduce redundant checkpointing data according to example implementations.

More specifically, referring to FIG. 3 in conjunction with FIG. 1, in accordance with an example implementation, a technique 300 includes generating checkpoint data chunks in a plurality of computing nodes of a distributed computing system that are executing an application, pursuant to block 304. The storing of this checkpoint data is regulated, pursuant to block 306 based on a replication of the checkpoint data among the nodes.

Figure 4:
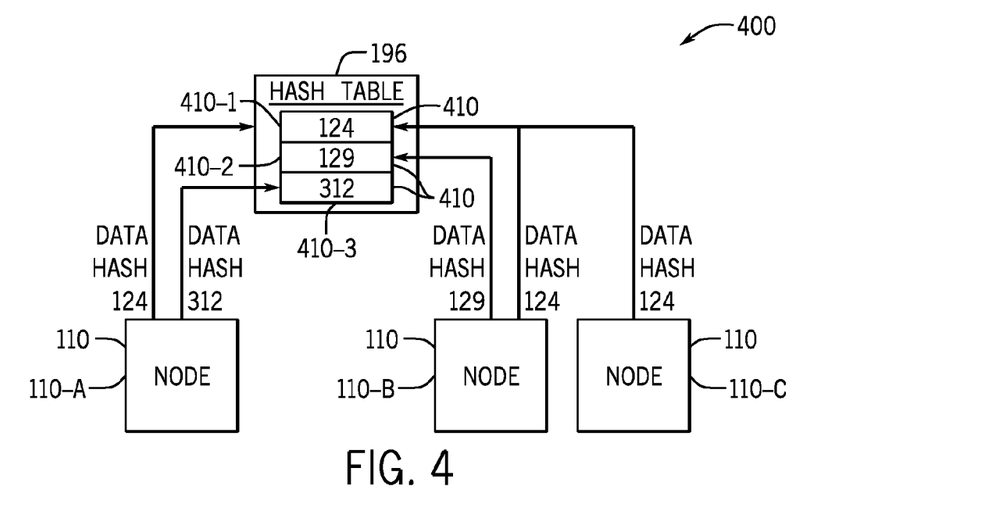
FIGS. 4 and 5 are illustrations of the use of a hash table to reduce redundant data associated with checkpointing according to example implementations.

More specifically, referring to FIG. 4 in conjunction with FIG. 1, in accordance with an example implementation, each computing node 110 (i.e., each application process) calculates a hash for the individual elements of its entire checkpoint data chunk. For example, in accordance with example implementations, a given computing node 110 may calculate hashes for the pages of its chunk. The computing node 110 sends the hash collection to the storage system 184, as an example. The data chunks may be of different granularities, varying from few bytes to several pages, depending on the particular implementation.

The checkpoint engine 192 maintains the hash table 196, as depicted for the example of FIG. 4, so that the different hash values are tracked by corresponding entries 410 of the hash table 196. The checkpoint engine 192 examines the entries 410 to identify redundant data elements and correspondingly instructs the computing nodes 110 (i.e., the application processes) to send the non-redundant data as part of their checkpoint chunks.

Figure 5:
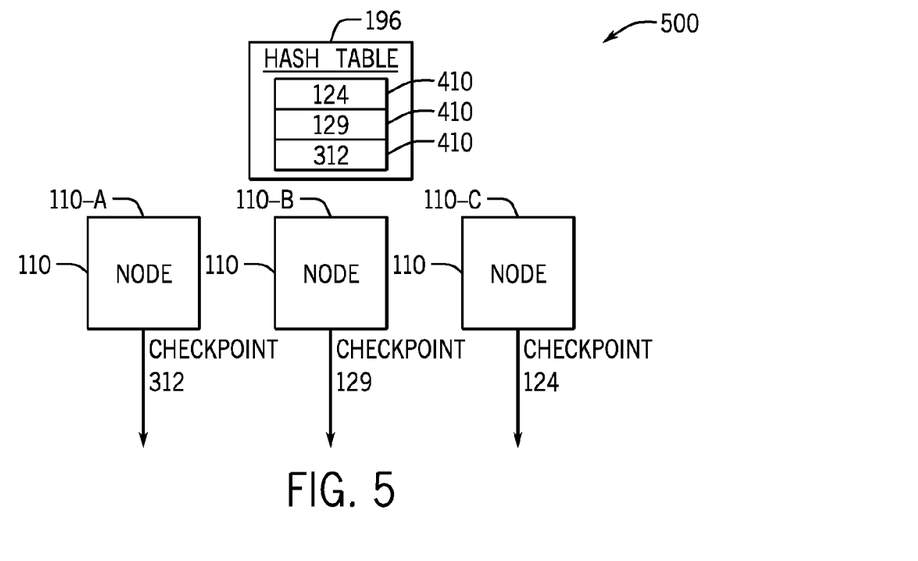

For the example of FIG. 4, the hash table 196 stores a value 410-1 indicating a hash value of 124, a value 410-2 indicating a hash value of 129 and a value 410-3 indicating a hash value of 312. For this example, three exemplary computing nodes 110-A, 110-B and 110-C each have a data element (a page, for example) with a hash value of "124." As a result, the node 186 requests the data element corresponding to the hash of "124" from the computing node 110-C, while requesting the data elements having corresponding checkpoints of "129" and "312" from the computing nodes 110-B and 110-A, as depicted in illustration 500 of FIG. 5.

Figure 6:
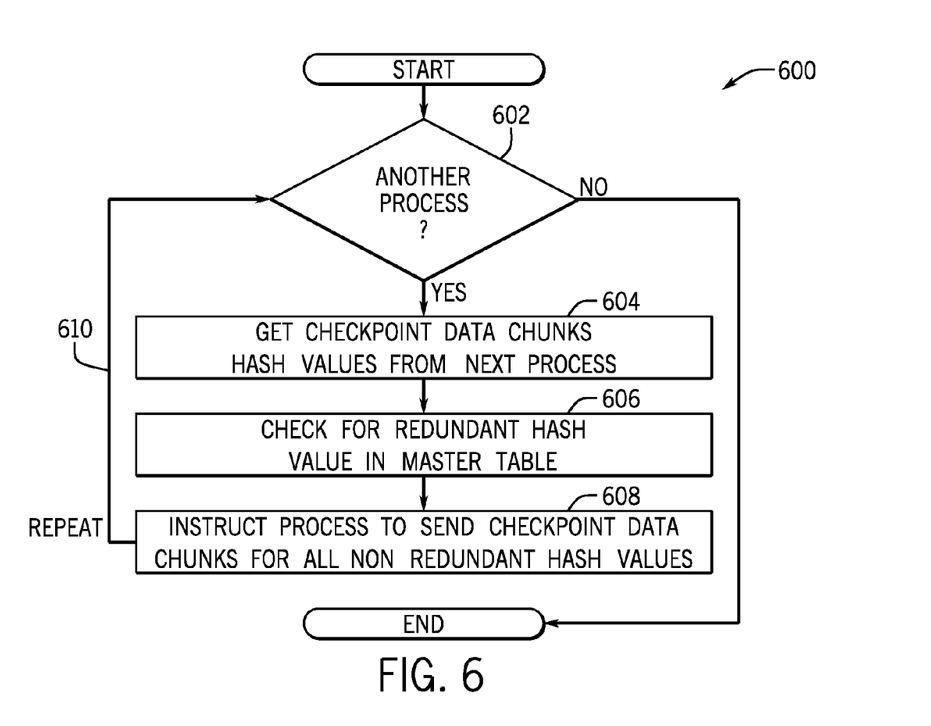

Due to the merging of redundant data elements, a substantial data movement reduction may be achieved thereby reducing the checkpoint overhead. In accordance with further implementations, the compression chunk size may be adaptively tuned. In this regard, smaller chunks may yield to better compression but use more data. Larger chunks may be summarized with a shorter hash, and hence require less communication but finding redundancy may be more challenging. By monitoring the compression ratio, evaluating previous checkpoints, and evaluating network bandwidth requirements of the application, the checkpoint engine 192 may adjust the compression chunk size Thus, to summarize, the checkpoint engine 192 may perform a technique 600 that is depicted in FIG. 6, in accordance with some implementations. Pursuant to the technique 600, a determination is made (decision block 602) whether for each process checkpoint data exists. If not, the technique 600 terminates. Otherwise, if checkpoint data for the next process is available, then the hashes for the available checkpoint data chunks are retrieved, pursuant to block 604. These hashes are checked against the hash table, pursuant to block 606. The checkpoint engine 192 may then instruct the process to send the checkpoint data elements for all non-redundant hash values, pursuant to block 608. Control then returns to decision block 602 to determine if the checkpoints for more processes are to be processed.

In accordance with further implementations, incremental checkpointing may be used, and the incremental checkpoint data size may be used to dynamically decide between data compression and data merging for reducing checkpoint overhead and optimizing the frequency of full application checkpoints.

More specifically, the application transparent checkpoint may either be a full checkpoint in which all chunks corresponding to the application state is checkpointed or an incremental approach in which changes from the previous checkpoint are saved. When the incremental checkpoint data is relatively small as compared to the total available storage space, multiple incremental versions may be inserted between full checkpoints. Moreover, all such incremental checkpoint versions may be compressed until the storage size reaches some maximum threshold, after which a full checkpoint may be generated, discarding the previous checkpoint data.

For applications having a large incremental checkpoint, due to storage constraints, the application frequently merge data across iterations. When frequent merging is used, compression/decompression may not be beneficial. Also, with merging approach, it may be sufficient to hold two versions of checkpoint data in persistent storage with the use of a full checkpoint. Therefore, by using the checkpoint data size to decide between data compression and merging, high performance benefits and reduced checkpoint storage may be achieved.

Figure 7:
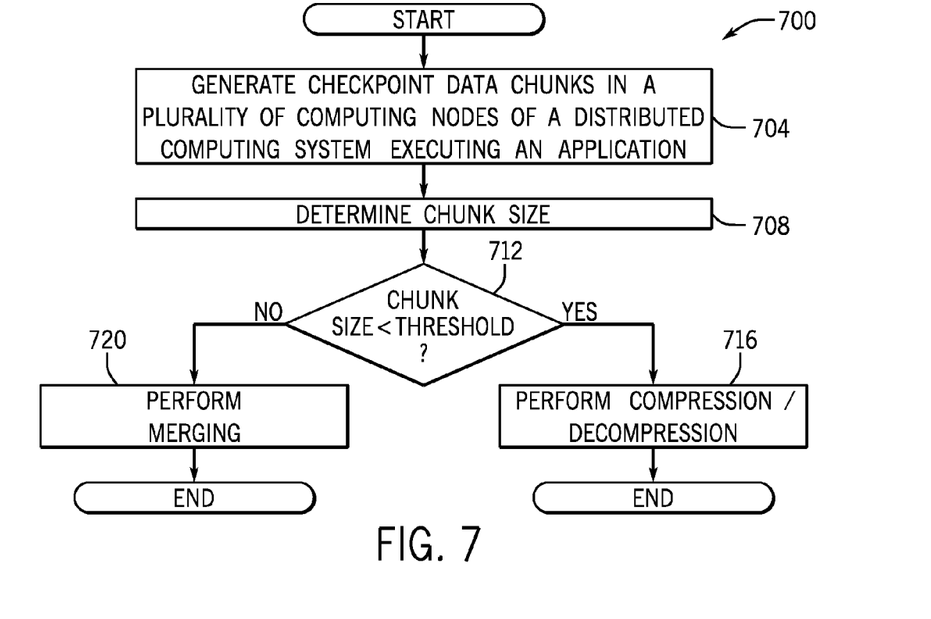
FIG. 7 is a flow diagram depicting a technique to regulate when compression, decompression and merging are performed in connection with checkpointing according to an example implementation.

Thus, referring to FIG. 7, a technique 700 in accordance with example implementations includes receiving (block 704) checkpoint data chunks in a plurality of computing nodes of a distributed computing system executing an application. A chunk size is determined, pursuant to block 708. If the chunk size is less than a threshold (decision block 712), then compression and decompression are performed, pursuant to block 716. Otherwise, if the chunk size is less than the threshold, the merging is performed, pursuant to block 720.

With a transparent checkpointing mechanism, all of the memory pages, registers and signals of a particular process are saved at regulate intervals. For purposes of restarting and resuming execution after a failure, the saved pages are restored from a persistent storage to memory. The probability of failure increases with increasing processors used by the application so that the interval between checkpoints decreases. However, saving all of the process states frequently may not be feasible for applications having a large memory footprint because of substantial storage and space overheads.

To overcome these restrictions, incremental checkpointing tracks and saves pages which have been modified at subsequent checkpoints. To track these modifications, one approach may be to mark particular chunks (pages, for example) with being read using an operating system write protected (WP) bit the first time that is page is modified after a given checkpoint. When the application attempts to modify the content on this page, the process generates an access fault, and a dirty bit is set for the page to indicate the changes, and the pages are granted write permission.

The checkpoint handler may handle the interrupt and take the appropriate action (such as marking the page for checkpointing, for example). With a checkpoint interval, this process of setting the write protect happens the first time the page is accessed, and then the step is repeated across checkpoint intervals. A challenge with this approach is that the overhead processing of an operating level exception may be high (thousands of cycles, for example), and the number of processor faults interrupting the application execution may have an impact on the node performance. Moreover, the "noise," or "jitter," of parallel applications may be increased which may slow down the overall execution of a large-scale parallel application.

Therefore, in accordance with example implementations, systems and techniques are disclosed herein, which use "application hints" that may be provided, for example, by the developer of the application. The application hints identify data structures that are more likely to be modified by the application during its execution.

As an example, application hints may be provided in the form of data that is stored in a configuration file, with no modification being made through the application nor with program level annotations (compiler "pragmas," for example) being used. The data structure hints are used to locate the memory pages that may have changed, and with the aid of operating system, the pages as frequency modified. Classification of frequently modified pages helps reduce the checkpoint overhead. This approach differs from explicit checkpoints, in that the application is not modified with the introduction of declarative and procedural statements that explicitly save and restore such data structures. Therefore, in accordance with example implementations disclosed herein, legacy applications may be benefited, which lack fault explicit tolerance mechanisms. Moreover, application hints may be used to annotate useful data but may be later extracted for scientific post processing like analytics, visualization or application validation, realizing some of the explicit checkpoint benefits using the transpiring checkpoint approach.

In general, the checkpoint reduction overhead may be simplistically described as follows:

Overhead reduction(in seconds)=(number of freq modified pages/total checkpoint pages)*time to track one page(in seconds)

Figure 8:
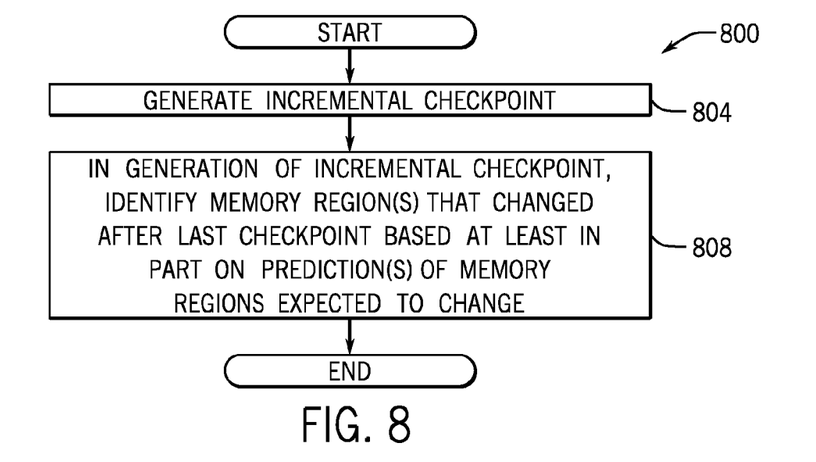
FIG. 8 is a flow diagram depicting a technique to predict memory regions that have changed for incremental checkpointing according to an example implementation.

Thus, referring to FIG. 8, in accordance with an example implementation, a technique 800 includes generating an incremental checkpoint, pursuant to block 804. In the generation of the incremental checkpoint, the technique 800 includes identifying (block 806) one or multiple memory regions that changed after the last checkpoint based at least in part on one or multiple predictions of memory regions that are expected to change. Thus, as set forth in the example above, this prediction may aided by the application hints.

Figure 9:
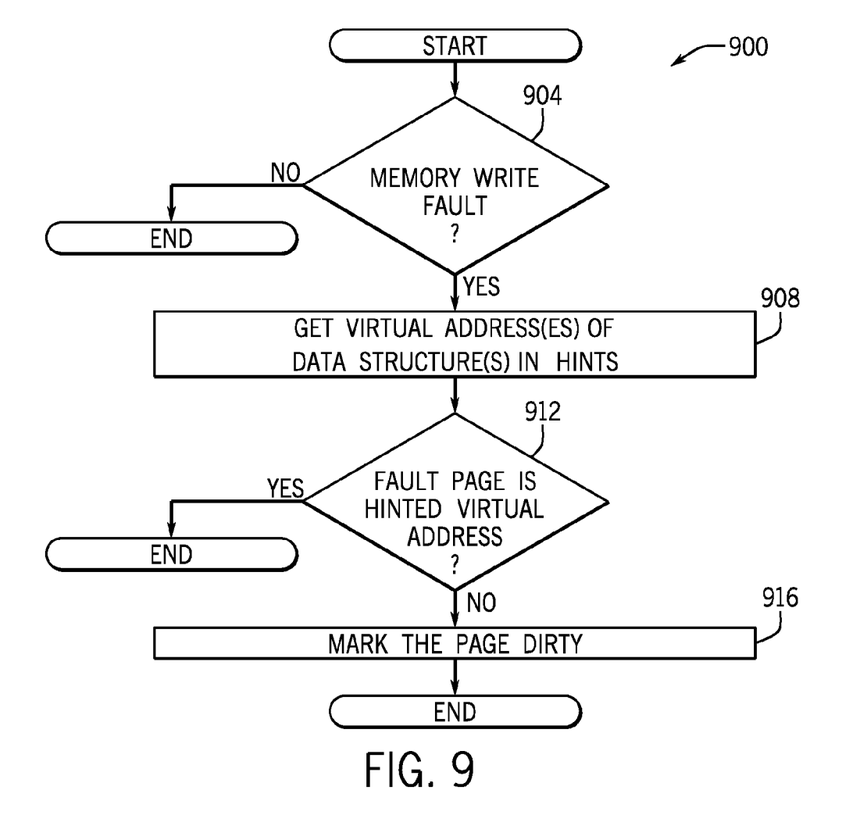
FIG. 9 is a flow chart depicting a technique to handle a memory fault when application hints are used for classifying frequently modified pages according to an example implementation.

As a more specific example, FIG. 9 depicts a technique 900 to process a memory fault, such as a memory fault that occurs when an attempt is made to write to a write protected page. Pursuant to the technique 900, a determination is made (decision block 904) whether a memory write fault has occurred. If so, the virtual address(es) of the corresponding data structures in the application hints, if available, are retrieved, pursuant to block 908. A determination is made (decision block 912) whether the fault page is hinted at by the virtual address. If so, then the page is already marked as being potentially modified and as such, will be included in the incremental checkpoint. Otherwise, the page is marked as being dirty, pursuant to block 916.

Figure 10:
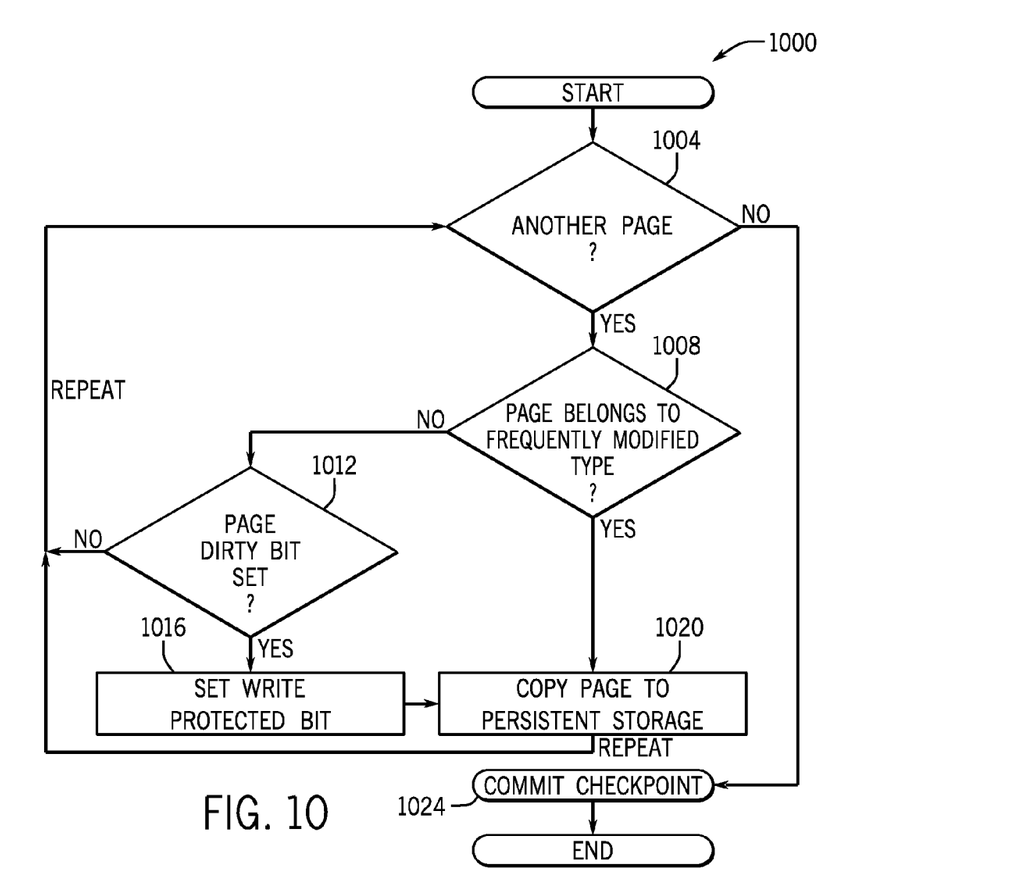
FIG. 10 is a flow chart depicting a technique to perform incremental checkpointing when application hints are used for classifying frequently modified pages according to an example implementation.

Referring to FIG. 10, using the above-described process, a technique 1000 may then be used for purposes of processing the pages for an incremental checkpoint using the application hints and by analyzing the pages otherwise. Pursuant to the technique 1000, a determination is made (decision block 1004) whether another page to process exists, and if so, a determination is made (decision block 1008) whether the page belongs to the frequently modified type, as provided, by the application hints, for example. If so, then the page is copied to persistent storage to form part of the incremental checkpoint, pursuant to block 1020. Otherwise, a determination is made (decision block 1012) whether a dirty bit is set for the page. If so, the page is copied to the persistent storage, pursuant to block 1020 to form part of the incremental checkpoint after setting (block 1016) the write protected bit to reset the bit. After all of the pages are processed, the checkpoint may then be committed to storage, pursuant to block 1024.

In accordance with further implementations, techniques other than application hints may be used to predict which pages may change for a given incremental checkpoint. In this manner, in accordance with further implementations, frequently modified pages may be classified using prediction techniques that identify frequently modified memory pages so that these pages may be obliviously copied to a persistent storage, thereby reducing the overall checkpoint overhead.

For example, in accordance with example implementations, a least recently used (LRU) algorithm may be used by maintaining an associated time stamp at which each page is accessed. In accordance with further implementations, a machine learning mechanism-based process, such as a Markov model, for example, may be used by maintaining a history table per process, which is indexed by a page identifier. Thus, through any of the aforementioned prediction mechanisms, the classification of pages at checkpoint P may be based on the history and access patterns of the previous P-1 checkpoints. This captures, for example the case, in which the user believes that a data structure is constantly over-written but during runtime, some of the pages of that data structure remain invariant for a long period of time.

In accordance with further implementations, frequently modified pages may be moved in memory for purposes of restructuring the memory to enhance the performance of incremental checkpointing. In this regard, memory pages allocated by applications may not necessarily be contiguous in physical memory in a virtual memory supported system. As a result, modified pages and unmodified pages may be located in non-contiguous sections of physical memory. To locate these modified pages, the system walks the pages across the process pages even in the case of incremental checkpoints. To reduce this search and page walk overhead, the frequently modified pages may be moved, or segregated, from unmodified pages into different regions in which the pages are stored in physically contiguous memory, in accordance with example implementations.

Figure 11:
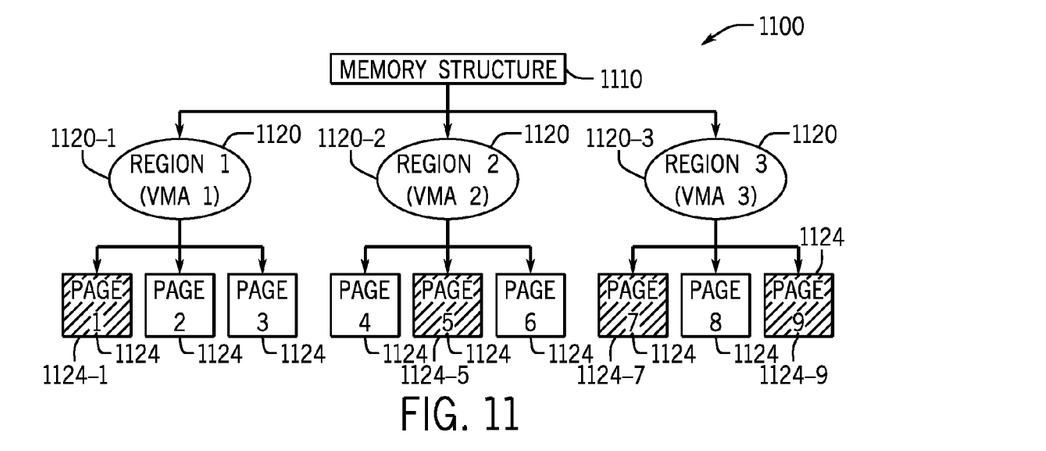
FIG. 11 is an illustration of a hierarchical memory structure in which frequently modified pages are not grouped together into contiguous physical memory locations.

More specifically, referring to FIG. 11, a given hierarchical memory structure 1100 may involve in a memory structure 1110 that is associated with one or multiple virtual memory area (VMA) structures 1120 (VMA structures 1120-1, 1120-2 and 1120-3 being depicted in FIG. 11 as examples). Each VMA structure 1120 has associated pages, such as exemplary pages 1124. Thus, for example, VMA structure 1120-1 is associated with pages 1124-1, 1124-2 and 1124-3, for this example. For these examples, the VMA structures 1120 have pages 1124 that are frequently accessed, such as pages 1124-1 (for the VMA structure 1120-1); page 1124-5 (for the VMA structure 1120-2, for example); and pages 1124-7 and 1124-9 (for the VMA structure 1120-3, for example). Thus, for this organization, a full process page walk is used to identify the modified pages. However, pursuant to FIG. 12, a technique may be employed for purposes of reclassifying the VMA structures 1120 to reorganize the structures in physically contiguous memory.

Figure 12:
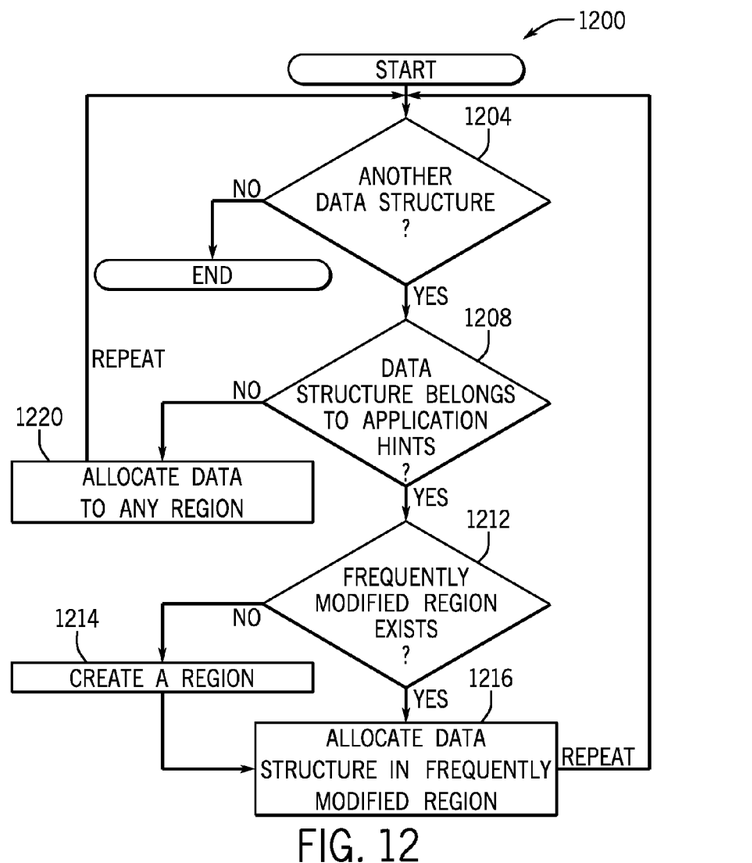
FIG. 12 is a flow diagram to allocate and classify frequently modified data structures using memory region reclassification according to an example implementation.

In this manner, referring to FIG. 12, a technique 1200 in accordance with an example implementation includes for each data structure allocation (block 1204) determining (decision block 1208) whether the structure belongs to a structure identified by application hints as frequently being modified. If so, a decision is made (decision block 1212) whether a frequently modified region currently exists. If so, then the data structure is allocated to this frequently modified region, pursuant to block 1216. Otherwise, the frequently modified region is created, pursuant to block 1214.

Thus, during the incremental checkpoint, all pages in an unmodified region may be obliviously copied. For all other regions, by using a region level dirty bit, a page walk time may be further reduced.

Figure 13:
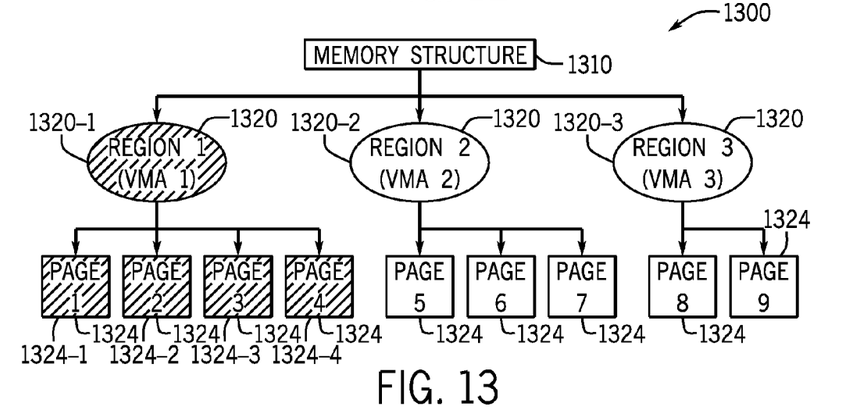
FIG. 13 is an illustration of a memory structure after the reclassification of FIG. 12 according to an example implementation.

FIG. 13 depicts the hierarchical memory organization 1300 for a memory structure 1310 after the above-described reclassification of frequently modified pages. As such, for this example, the reorganized memory structure 1310 has VMA structures 1320-1, 1320-2 and 1320-3. For this example, the VMA structure 1320-1 is a frequently modified region having physically contiguous memory pages 1324-1, 1324-2, 1324-3 and 1324-4. The other VMA memory structures 1320-2 and 1320-3, for this example, have corresponding pages 1324, which are not necessarily located in physically contiguous pages of memory.

Thus, a substantial reduction in transparent checkpoint overhead may be reduced by classifying frequently modified data using applications hints to reduce dirty page tracking and processor faults. The reduction of modified pages/page walk time by exploiting operating system memory hierarchy may be achieved by using region level page classification. Moreover, important data and flexibility may be annotated to recover checkpoint data for analytics and visualization without the need to restart the application. Other and different advantages are contemplated, in accordance with the scope of the appended claims.

While a limited number of examples have been disclosed herein, those skilled in the art, having the benefit of this disclosure, will appreciate numerous modifications and variations therefrom. It is intended that the appended claims cover all such modifications and variations.

What is claimed is:
1. A method comprising:
generating a checkpoint for an application, the application being executed in a distributed fashion across a plurality of nodes of a distributed computing system,
wherein forming the checkpoint comprises selectively regulating communication of data from the plurality of nodes to a storage subsystem based at least in part on a replication of the data among the nodes.
2. The method of claim 1, wherein forming the checkpoint further comprises:
selectively compressing data and selectively communicating the selectively compressed data to the storage subsystem based at least in part on the replication of the data among the nodes.
3. The method of claim 1, wherein forming the checkpoint further comprises:
determining whether elements of data stored on at least two of the nodes are replicas; and
selectively communicating the data comprises:
if the elements are determined to be replicas, requesting a first element of the elements to be communicated to the storage system without requesting the remaining one or more elements to be communicated to the storage system.
4. The method of claim 3, wherein determining whether the elements are replicas comprises:

determining hashes of the elements;
communicating the hashes to the storage system; and
using the storage system to determine whether elements of data are replicas based on the hashes.

5. The method of claim 4, wherein using the storage system comprises comparing the hashes to a table listing hashes for data stored on the nodes.

6. The method of claim 1, wherein the data comprises chunks of operating system images store on the nodes.

7. A method comprising:
generating an incremental checkpoint for an application executing on a least one computing node,
wherein the generating comprises identifying at least one memory region of the at least one computing node which has changed after generation of a prior checkpoint based at least in part on a prediction on whether the at least one memory region is expected to change after the generation of the prior checkpoint.

8. The method of claim 7, wherein identifying the at least one memory region comprises identifying the at least one region based at least in part on a configuration data identifying at least one data structure likely to change.

9. The method of claim 7, wherein identifying the at least one memory region comprises:
analyzing a pattern of memory region changes identified in connection with the generation of at least one prior checkpoint and identifying the at least one region based at least in part on a the analysis.

10. The method of claim 9, wherein analyzing comprises applying a least recently used-based algorithm or a machine learning-based algorithm.

11. The method of claim 7, the method further comprising:
organizing pages associated with the application into a first contiguous region for pages identified as being relatively frequently modified and a second region for other pages associated with being relatively infrequently modified,
wherein the generating processing the pages based on whether the pages are in the first contiguous region or the second region.

12. The method of claim 11, wherein processing the pages comprises copying the pages in the first contiguous region to form the incremental checkpoint without checking for changes and selectively copying the second contiguous region based on a determination of whether changes have occurred.

13. A system comprising:
a distributed computing system comprising a plurality of nodes; and
a storage subsystem separate from the distributed computing system to form a checkpoint for an application executing on the nodes, the storage subsystem being adapted to selectively regulate communication of data from the plurality of nodes to the storage subsystem based at least in part on a replication of the data among the nodes.

14. The system of claim 13, wherein the storage subsystem is adapted to control whether the data is compressed or replicas of the data are merged based at least in part on a size of checkpoint chunks processed by the nodes.

15. The system of claim 14, wherein the storage subsystem is adapted to compress the data in response to the size being below a predetermined threshold.

16. The system of claim 13, wherein the storage system is adapted to:
determine whether elements of data stored on at least two of the nodes are replicas; and
if the elements are determined to be replicas, request a first element of the elements to be communicated to the storage system without requesting the remaining one or more elements to be communicated to the storage system.

17. The system of claim 13, wherein the storage system is adapted to:
receive hashes of the elements; and
determine whether elements are replicas based on the hashes.

18. The system of claim 17, wherein the storage system is adapted to comparing the hashes to a table listing hashes for data stored on the nodes.

19. The system of claim 13, wherein the data comprises chunks of operating system images store on the nodes.

20. The system of claim 13, wherein data indicates incremental changes for each node.

* * * * *